(12) United States Patent
Min

(10) Patent No.: US 9,921,562 B2
(45) Date of Patent: Mar. 20, 2018

(54) PROGRAMMABLE SWITCHING SYSTEM

(71) Applicant: Hao Min, Nanjing (CN)

(72) Inventor: Hao Min, Nanjing (CN)

(73) Assignee: NANJING EASTHOUSE ELECTRICAL CO., LTD., Nanjing (CN)

(*) Notice: Subject to any disclaimer, the term of this patent is extended or adjusted under 35 U.S.C. 154(b) by 295 days.

(21) Appl. No.: 14/763,923

(22) PCT Filed: Jul. 23, 2015

(86) PCT No.: PCT/CN2015/084944
§ 371 (c)(1),
(2) Date: Jul. 28, 2015

(87) PCT Pub. No.: WO2017/012121
PCT Pub. Date: Jan. 26, 2017

(65) Prior Publication Data
US 2017/0146968 A1    May 25, 2017

(51) Int. Cl.
*G05B 19/05* (2006.01)
*G05B 19/042* (2006.01)
*H04L 29/08* (2006.01)

(52) U.S. Cl.
CPC ....... *G05B 19/0426* (2013.01); *G05B 19/056* (2013.01); *G05B 2219/2642* (2013.01); *H04L 67/125* (2013.01)

(58) Field of Classification Search
CPC .............. G05B 19/0426; G05B 19/056; G05B 2219/2642; G05B 2219/163; H04L 67/125

USPC ......................................................... 700/275
See application file for complete search history.

(56) References Cited

U.S. PATENT DOCUMENTS

| | | | | |
|---|---|---|---|---|
| 5,877,957 A * | 3/1999 | Bennett | ................ | G05B 19/042 340/286.01 |
| 6,792,319 B1 * | 9/2004 | Bilger | .................... | G05B 15/02 700/12 |
| 8,818,532 B1 * | 8/2014 | Vasquez | ................ | H02J 13/002 700/17 |
| 8,947,199 B2 * | 2/2015 | Lucaci | .................. | H04L 12/282 340/12.22 |

(Continued)

*Primary Examiner* — Jason D Mitchell
(74) *Attorney, Agent, or Firm* — Ming Jiang; MM IP Services LLC

(57) ABSTRACT

The present invention relates to a programmable switching system having N interconnected switching devices (ISDs), each of the ISDs having a unique network address. An ISD includes a switch operating in switching mode and programming mode, a communication interface, a microprocessor, and a memory. The microprocessor controls operation of ISDs when switch is in switching mode and programs ISD when switch is in programming mode. The memory includes a network address storage, and firmware. When the firmware is executed at the microprocessor, firmware is configured to: communicate with all ISDs of programmable switching system through communication interface over a network, receive user's inputs at switches of ISDs, and in response of the received user's inputs, to program ISDs, when switch is in programming mode, and receive user's input at the switch to perform switching functions of the ISD, when the switch is in switching mode.

16 Claims, 5 Drawing Sheets

(56) References Cited

U.S. PATENT DOCUMENTS

| | | | | |
|---|---|---|---|---|
| 2002/0044042 A1* | 4/2002 | Christensen | ............ | G05B 15/02 340/3.54 |
| 2005/0090915 A1* | 4/2005 | Geiwitz | ................. | G05B 15/02 700/90 |
| 2012/0079074 A1* | 3/2012 | Mccormack | ............ | G08C 17/02 709/217 |
| 2013/0184880 A1* | 7/2013 | McMahon | ............. | G05B 15/02 700/286 |
| 2013/0200725 A1* | 8/2013 | Apelker | ................. | G05B 15/02 307/117 |
| 2015/0120000 A1* | 4/2015 | Coffey | ................. | H04L 12/2803 700/13 |
| 2016/0344570 A1* | 11/2016 | Ong | ..................... | H04L 12/2807 |

\* cited by examiner

PROGRAMMABLE SWITCHING SYSTEM

FIELD

The present disclosure generally relates to electrical switching system, and more particularly to a method and an apparatus for programming and using a network of interconnected electrical switching devices in a programmable switching system.

BACKGROUND

Traditionally, there are many switches for lights, and household appliances. In most cases, each of the lights and household appliances is controlled by a switch. The light in the foyer is usually located at the entrance of a house, and lights in a room is usually located in the room, either near the entrance, or near a bed. However, if someone needs to get up from the bed in the middle of the night and go to bathroom, he has to turn on a series of lights such as bedroom lights, hallway lights, and bathroom lights. Under current construction and design, it is very difficult to turn on all those lights by pressing one button, or turning on one switch. Although there are intelligent household automation and control tools available on the market, these tools tend to be very expensive, and very difficult to set up or program. It is desirable to have certain programmable switches to replace the existing switches in a household such that these switches can be flexibly and easily programmed to control one or more lights or household appliances.

Therefore, a heretofore unaddressed needs still exist in the art to address the aforementioned deficiencies and inadequacies.

SUMMARY

In one aspect, the present invention relates to a programmable switching system. In certain embodiments, the programmable switching system includes a group of N interconnected switching devices (ISDs). Each of the ISDs has a unique network address. An ISD includes (a) a switch, (b) a communication interface, (c) a microprocessor, and (d) a memory. The switch is configured to operate in a switching mode and a programming mode. The communication interface interconnects the ISDs of the programmable switching system over a network. The microprocessor controls the operation of the ISD when the switch is in the switching mode and programs the ISD when the switch is in the programming mode. The memory includes a network address storage, and firmware. In certain embodiments, each of the ISDs also includes: (e) an electrical power input connected to an electrical power source through an input power line, (f) an electrical power output connected to at least one appliance through an output power line, and (g) an output control circuit to receive instructions from the microprocessor and control the electrical power output.

When the firmware is executed at the microprocessor, the firmware is configured to: (a) communicate with all ISDs of the programmable switching system through the communication interface over the network, (b) receive user's inputs at the switches of the ISDs of the programmable switching system, and in response of the received user's inputs, to program the ISDs, when the switch is in the programming mode, and (c) receive user's input at the switch to perform switching functions of the ISD, when the switch is in the switching mode.

In certain embodiments, each of the ISDs may be configured as a master ISD and the remainder of the ISDs may be configured as slave ISDs. Some or all of the slave ISDs may be programmed to perform switching functions in response to the instructions from the master ISD. For example, when the master ISD is turned on, appliances connected to the master ISD, and all appliances connected to the N−1 slave ISDs may be turned on, simultaneously. When the master ISD is turned off, appliances connected to the master ISD, and all appliances connected to the N−1 slave ISDs may be turned off, simultaneously.

In certain embodiments, for the programmable switching system having N ISDs, the network address storage of a master ISD includes: a local network address storage, and a remote network address storage, each having N storage spaces, one for each of the N ISDs. The local network address storage is configured to store network addresses of N ISDs of a programmable switching system having control over a corresponding appliance connected to the master ISD. The remote network address storage is configured to store network addresses of the N ISDs controlled by the master ISD.

In certain embodiments, the switch of each of the ISDs is configured to perform following functions: (a) a first function PRO_ADD to set the switch in a programming adding mode and add one or more ISDs in the programmable switching system to be controlled by the switch of the master ISD, (b) a second function PRO_REMOVE to set the switch in a programming removing mode and to remove one or more ISDs from the programmable switching system to be controlled by the switch of the master ISD, (c) a third function SW_SET to provide input to the switch for associating the network addresses of the ISDs with the master ISD, (d) a fourth function of PRG_OFF to set the switch in the switching mode, (e) a fifth function SW_ON to turn on the all appliances connected to the ISDs with their network addresses stored in the remote network address storage of the master ISD, and (f) a sixth function SW_OFF to turn off the all appliances connected to the ISDs with their network addresses stored in the remote network address storage of the master ISD.

In certain embodiments, the switch includes: (a) a first push button switch for the selection of the fifth function SW_ON, (b) a second push button switch for the selection of the sixth function SW_OFF, (c) a third push button switch for the selection of the third function SW_SET, and (d) a three position switch for the selection of the first function PRG_ADD, the second function PRG_REMOVE, and the fourth function PRG_OFF. In certain embodiments, the firmware of the master ISD is configured to: (a) receive a user selection of the first function PRO_ADD to add one or more ISDs in the programmable switching system to be controlled by the switch of the master ISD, (b) set the switch of the master ISD in a programming adding mode, (c) send a programming adding command to the ISDs through the communication interface of the master ISD, (d) receive an input from a user selection of the third function SW_SET from a switch of a n-th ISD, (e) compare the network address of the n-th ISD with the network addresses stored in the remote network address storage of the master ISD, (f) write the network address of the n-th ISD in the n-th network address storage space of the remote network address storage, when the network address of the n-th ISD is not found in the remote network address storage, (g) repeat the last three actions (d), (e), and (f) to complete the programming for each of the ISDs, (h) receive a user selection of the fourth function PRO_OFF to end the programming mode, and (i) set the switch of the master ISD in the switching mode.

In certain embodiments, the firmware of the master ISD is further configured to: (a) receive a user selection of the first function PRO_REMOVE to remove one or more ISDs from the programmable switching system to be controlled by the switch of the master ISD, (b) set the switch of the master ISD in a programming removing mode, (c) send a programming removing command to the ISDs through the communication interface of the master ISD, (d) receive an input from a user selection of the third function SW_SET from a switch of a n-th ISD, (e) compare the network address of the n-th ISD with the network addresses stored in the remote network address storage of the master ISD, (f) delete the network address of the n-th ISD in the n-th network address storage space of the remote network address storage, when the network address of the n-th ISD is found in the remote network address storage, (g) repeat the last three actions (d), (e), and (f) to complete the programming for each of the ISDs, (h) receive a user selection of the fourth function PRO_OFF to end the programming mode, and (i) set the switch of the master ISD in the switching mode.

In certain embodiments, the firmware of the master ISD is further configured to: (a) receive a user selection of the fifth function SW_ON from the switch of the master ISD, (b) send a turning on command to the ISDs with all network addresses stored in the remote network address storage of the master ISD, and (c) instruct each of the ISDs to compare the received network addresses with the network addresses stored in the local network address storage of the ISD, and turn on the appliances connected to the ISDs when the network address of the ISD is found in the local network address storage of the ISD.

In certain embodiments, the firmware of the master ISD is further configured to: (a) receive a user selection of the fifth function SW_OFF from the switch of the master ISD, (b) send a turning off command to the ISDs with all network addresses stored in the remote network address storage of the master ISD, and (c) instruct each of the ISDs to compare the received network addresses with the network addresses stored in the local network address storage of the ISD, and turn off the appliances connected to the ISDs when the network address of the ISD is found in the local network address storage of the ISD.

In certain embodiments, the network includes a wired network, the internet, local area network (LAN), wide area network (WAN), a wireless network, mobile communication network, Wi-Fi network, Zigbee personal area network, and Bluetooth network.

In another aspect, the present invention relates to a method of programming a group of interconnected switching devices (ISD) to form a programmable switching system. The method includes one or more of following operations: (a) designating an ISD of the plurality of ISDs as a master ISD, and designating the remainder of the plurality of the ISDs as slave ISDs, wherein each of the plurality of ISDs has a unique network address, (b) communicating with the ISDs through a communication interface of the master ISD over a network, (c) receiving a user's input at a switch of the master ISD to set the switch into one of the two modes: a programming mode, and a switching mode. When the switch of the master ISD is in the programming mode, the method includes: (d) receiving a user's input at the switch of the master ISD to add one or more ISDs into the programmable switching system or remove one or more ISDs from the programmable switching system, and (e) programming the ISDs in response to the user's inputs at the switches of the ISDs of the programmable switching system. When the switch of the master ISD is in the switching mode, the method includes: (f) receiving a user's input at the switch of the master ISD to turn on or off the appliances of the ISDs with their network addresses stored in a remote network address storage of the master ISD, and (g) turning on or off the appliances of the ISDs with their network addresses stored in a remote network address storage of the master ISD.

In certain embodiments, each of the ISDs in the programmable switching system includes: (a) the switch, (b) the communication interface, (c) a microprocessor, (d) a memory, (e) an electrical power input, (f) an electrical power output, (g) an electrical power output, and (h) an output control circuit. The switch is configured to operate in the switching mode and the programming mode. The communication interface interconnects the ISDs of the programmable switching system over the network. The microprocessor controls operation of the ISDs when the switch is in the switching mode and programs the ISDs when the switch is in the programming mode. The memory has a network address storage, and firmware. When the firmware is executed at the microprocessor, the firmware is configured to: control operation of the ISD when the switch is in the switching mode, and program the ISDs when the switch is in the programming mode. The electrical power input connects to an electrical power source through an input power line. The electrical power output connects to at least one appliance through an output power line. The output control circuit receives instructions from the microprocessor and controls the electrical power output.

In certain embodiments, for the programmable switching system having N ISDs, the network address storage of a master ISD includes: a local network address storage, and a remote network address storage, each having N storage spaces, one for each of the N ISDs. The local network address storage is configured to store network addresses of N ISDs of a programmable switching system having control over a corresponding appliance connected to the master ISD. The remote network address storage is configured to store network addresses of the N ISDs controlled by the master ISD.

In certain embodiments, the switch of each of the ISDs is configured to perform following functions: (a) a first function PRO_ADD to set the switch in a programming adding mode and to add one or more ISDs in the programmable switching system to be controlled by the switch of the master ISD, (b) a second function PRO_REMOVE to set the switch in a programming removing mode and to remove one or more ISDs from the programmable switching system to be controlled by the switch of the master ISD, (c) a third function SW_SET to provide input to the switch for associating the network addresses of the ISDs with the master ISD, (d) a fourth function of PRG_OFF to set the switch in the switching mode, (e) a fifth function SW_ON to turn on the all appliances connected to the ISDs with their network addresses stored in the remote network address storage of the master ISD, and (f) a sixth function SW_OFF to turn off the all appliances connected to the ISDs with their network addresses stored in the remote network address storage of the master ISD.

In certain embodiments, the switch includes: (a) a first push button switch for the selection of the fifth function SW_ON, (b) a second push button switch for the selection of the sixth function SW_OFF, (c) a third push button switch for the selection of the third function SW_SET, and (d) a three position switch for the selection of the first function PRG_ADD, the second function PRG_REMOVE, and the fourth function PRG_OFF.

In certain embodiments, the method includes one or more of following operations: (a) receiving a user selection of the first function PRO_ADD to add one or more ISDs in the programmable switching system to be controlled by the switch of the master ISD, (b) setting the switch of the master ISD in the programming adding mode, (c) sending a programming adding command to the ISDs through the communication interface of the master ISD, (d) receiving an input from a user selection of the third function SW_SET from a switch of a n-th ISD, (e) comparing the network address of the n-th ISD with the network addresses stored in the remote network address storage of the master ISD, (f) writing the network address of the n-th ISD in the n-th network address storage space of the remote network address storage of the master ISD, when the network address of the n-th ISD is not found in the remote network address storage of the master ISD, (g) repeating the last three operations (d), (e), and (f) to complete the programming for each of the ISDs, (h) receiving a user selection of the fourth function PRO_OFF at the switch of the master ISD, and (i) setting the switch of the master ISD in the switching mode.

In certain embodiments, the method includes one or more of following operations: (a) receiving a user selection of the first function PRO_REMOVE to remove one or more ISDs from the programmable switching system to be controlled by the switch of the master ISD, (b) setting the switch of the master ISD in the programming removing mode, (c) sending a programming removing command to the ISDs through the communication interface of the master ISD, (d) receiving an input from a user selection of the third function SW_SET from a switch of a n-th ISD, (e) comparing the network address of the n-th ISD with the network addresses stored in the remote network address storage of the master ISD, (f) deleting the network address of the n-th ISD in the n-th network address storage space of the remote network address storage of the master ISD, when the network address of the n-th ISD is found in the remote network address storage of the master ISD, (g) repeating the last three operations (d), (e), and (f) to complete the programming for each of the ISDs, (h) receiving a user selection of the fourth function PRO_OFF at the switch of the master ISD, and (i) setting the switch of the master ISD in the switching mode.

In certain embodiments, the method includes one or more of following operations: (a) receiving a user selection of the fifth function SW_ON from the switch of the master ISD, (b) sending a turning on command to the ISDs with all network addresses stored in the remote network address storage of the master ISD, and (c) instructing each of the ISDs to compare the received network addresses with the network addresses stored in the local network address storage of the ISD, and turn on the appliance connected to the ISD when the network address of the ISD is found in the local network address storage of the ISD.

In certain embodiments, the method includes one or more of following operations: (a) receiving a user selection of the fifth function SW_OFF from the switch of the master ISD, (b) sending a turning off command to the ISDs with all network addresses stored in the remote network address storage of the master ISD, and instructing each of the ISDs to compare the received network addresses with the network addresses stored in the local network address storage of the ISD, and turn on the appliance connected to the ISD when the network address of the ISD is found in the local network address storage of the ISD.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

Figure 1:
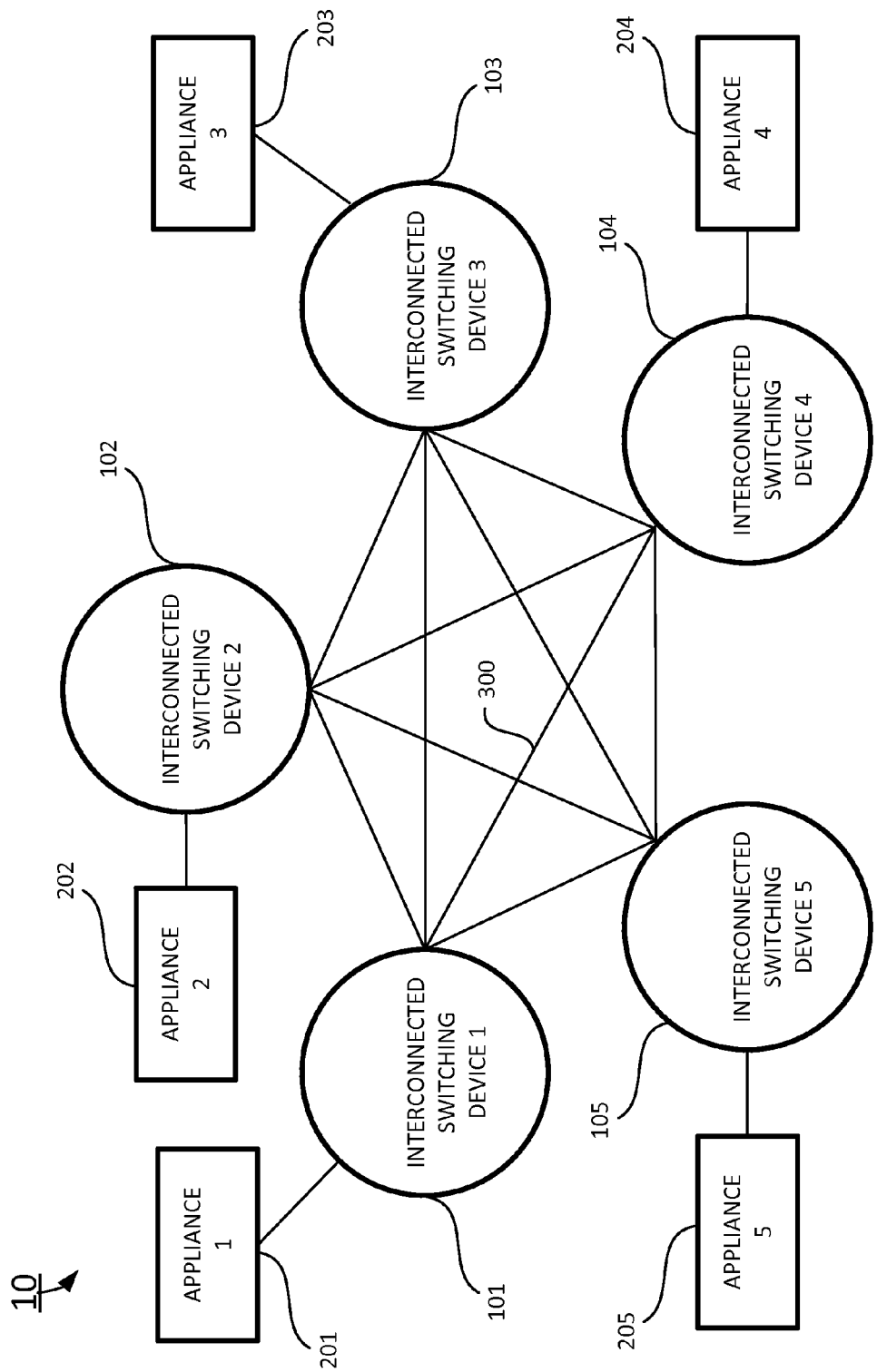
FIG. 1 schematically shows a programmable switching system having several interconnected switching devices in a mesh configuration according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art Like numbers refer to like elements throughout.

Figure 2:
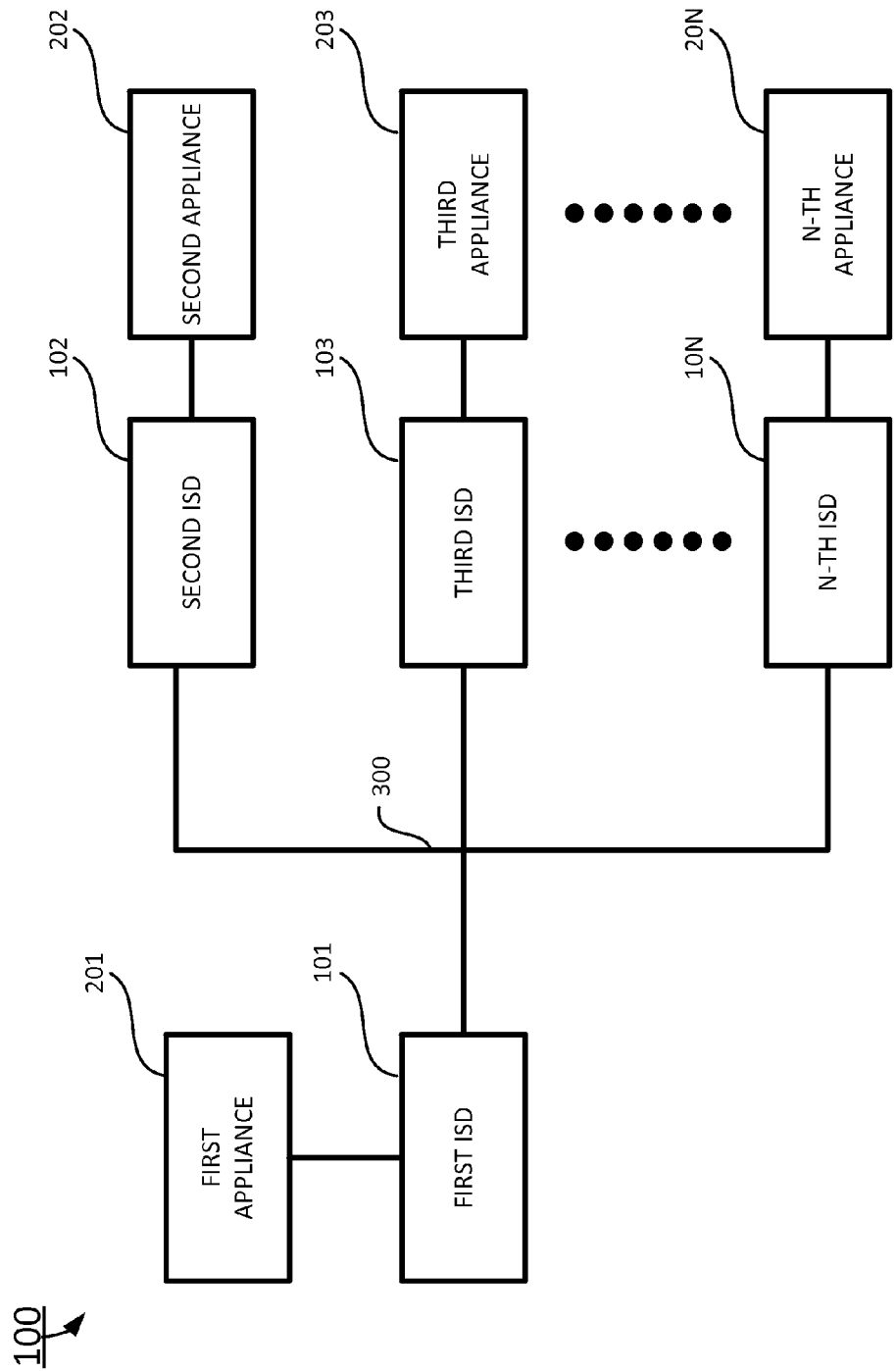
FIG. 2 schematically shows a programmable switching system having several interconnected switching devices in a master and slave configuration according to one embodiment of the present disclosure.

In one aspect, the present invention relates to a programmable switching system 10 as shown in FIGS. 1-5. In certain embodiments, the programmable switching system 10 includes a group of N interconnected switching devices (ISDs) through a network 300. Each of the ISDs has a unique network address. These ISDs includes a first ISD 101, a second ISD 102, a third ISD 103, a fourth ISD 104, and a fifth ISD 105, arranged in a mesh configuration as shown in FIG. 1, where each of the ISDs 100 has a direct connection through the network 300. These ISDs 101, 102, 103, 104, and 105 as shown in FIG. 1, may be collectively referred as ISDs 100. One or more appliances may be connected and controlled by each of these ISDs 100. As shown in FIG. 1, a first Appliance 1 201 is connected to and controlled by the first ISD 101, a second Appliance 2 202 is connected to and controlled by the second ISD 102, a third Appliance 3 203 is connected to and controlled by the third ISD 103, a fourth Appliance 4 204 is connected to and controlled by the fourth ISD 104, and a fifth Appliance 5 205 is connected to and controlled by the fifth ISD 105. These appliances 201, 202, 203, 204, and 205 may be collectively referred as appliances 200. They can also be arranged in a master and slave configuration as shown in FIG. 2, where an ISD 101 is designated as a master ISD, and each of N−1 ISDs, 102, 103, . . . , and 10N is designated as slave ISDs, and that are directly connected to the master ISD 101. One or more appliances may be connected to and controlled by each of the ISDs 100 as shown in FIG. 2. A First Appliance 201 is connected to and controlled by the master ISD 101, a second Appliance 202 is connected to and controlled by the second ISD 102, a third Appliance 203 is connected to and controlled by the third ISD 103, . . . , and a N-th Appliance 20N is connected to and controlled by the N-th ISD 10N. These appliances may be collectively referred as appliances 200. When the master ISD is turned on, appliances connected to the master ISD, and all appliances connected to the N−1 slave ISDs may be turned on, simultaneously, and when the master ISD is turned off, all appliances connected to the master ISD, and all appliances connected to the N−1 slave ISDs may be turned off, simultaneously.

In certain embodiments, the appliances 200 may be any of the lights, and household appliances powered by electricity. For example, the appliances includes: house lights, electric ceiling fans, television sets, air conditioners, cable set-top boxes, floor lamps, table lamps, desktop or laptop computers, toaster oven, microwave ovens, conventional ovens, refrigerators and many other electric devices.

In certain embodiments, the network 300 may be a wired network or a wireless network. The network 300 may be one of the Internet, local area network (LAN), wide area network (WAN), a wireless network, mobile communication network, Wi-Fi network, Zigbee personal area network, and Bluetooth network. A key advantage of having a wireless network 300 connecting all ISDs 100 is that these ISDs 100 can be used to replace the existing switches in the wall without adding additional wiring.

In certain embodiments, each of the ISDs 100 may be configured as a master ISD 101 and the remainder of the ISDs 100 may be configured as slave ISDs 100. Some or all of these slave ISDs may be programmed to perform switching functions in response to the instructions from the master ISD 101. For example, in one embodiment as shown in FIG. 2, when the master ISD 101 is turned on, all appliances such as the first appliance 201 connected to the master ISD 101, the second appliance 202 connected to the second ISD 102 programmed as a slave ISD, the third appliance 203 connected to the third ISD 103 programmed as a slave ISD, . . . , and the N-th appliance 20N connected to the N-th ISD 10N programmed as a slave ISD may be turned on, simultaneously. When the master ISD 101 is turned off, all appliances 201, 202, 203, . . . , and 20N connected to the master ISD 101 and the slave ISDs 102, 103, . . . , and 10N may be turned off, simultaneously.

Figure 3:
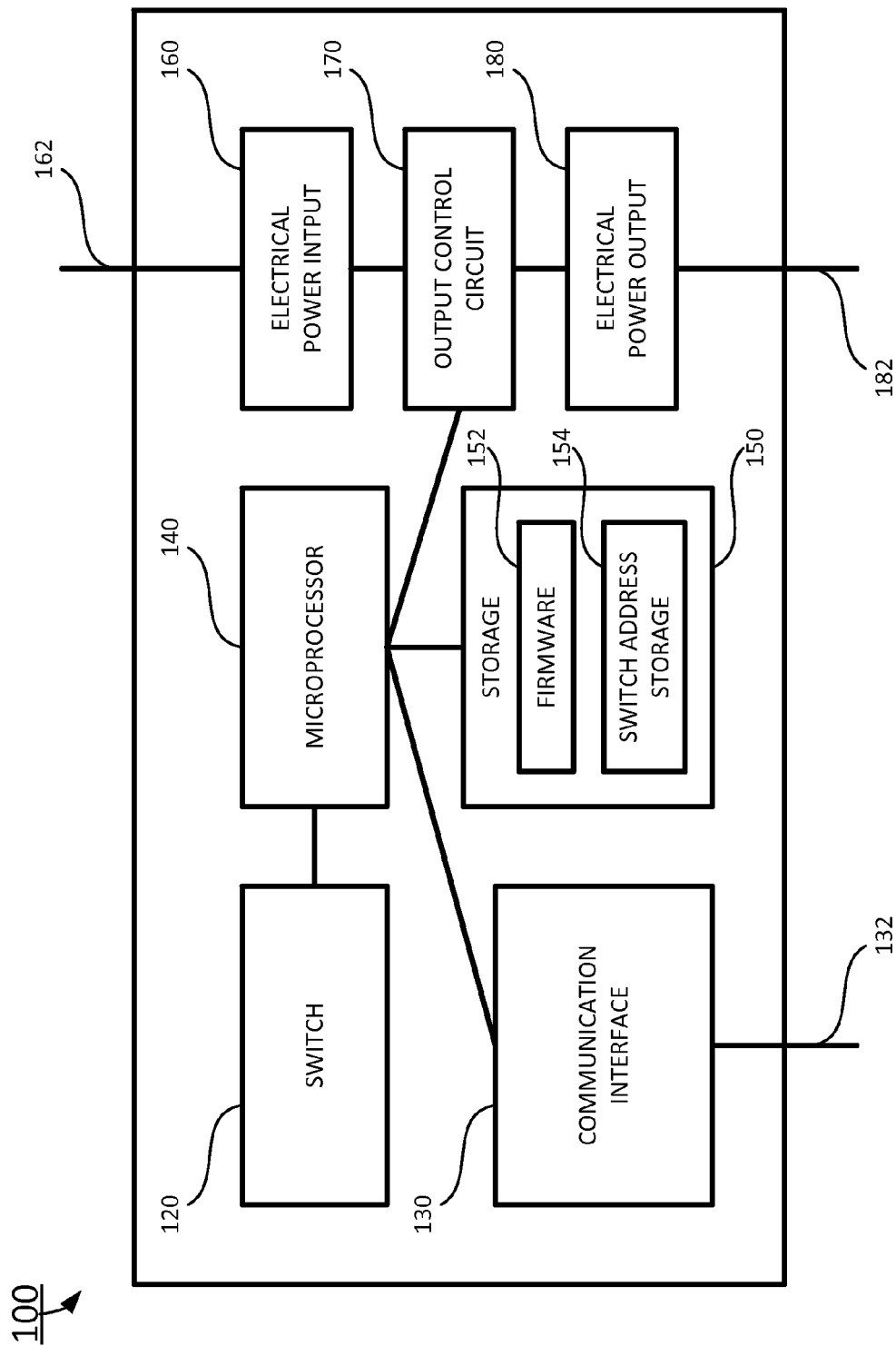
FIG. 3 shows an exemplary interconnected switching device according to one embodiment of the present disclosure.

Referring now to FIG. 3, a conceptual illustration of an ISD 100 is shown according to one embodiment of the present disclosure. The ISD 100 includes (a) a switch 120, (b) a communication interface 130 to other ISDs through a communication channel 132, (c) a microprocessor 140, (d) a memory 150, (e) an electrical power input 160 connected to an electrical power source through an input power line 162, (f) an electrical power output 180 connected to at least one appliance 200 through an output power line 182, and (g) an output control circuit 170 to receive instructions from the microprocessor 140 and control the electrical power output 180.

The communication interface 130 interconnects the ISDs 100 of the programmable switching system 10 over the network 300. For a wired internet connection, the communication interface 130 may be a network interface card (NIC). For a wireless network, the communication interface 130 may be a mobile communication interface, a Wi-Fi interface, a Zigbee interface or Bluetooth interface.

Figure 4:
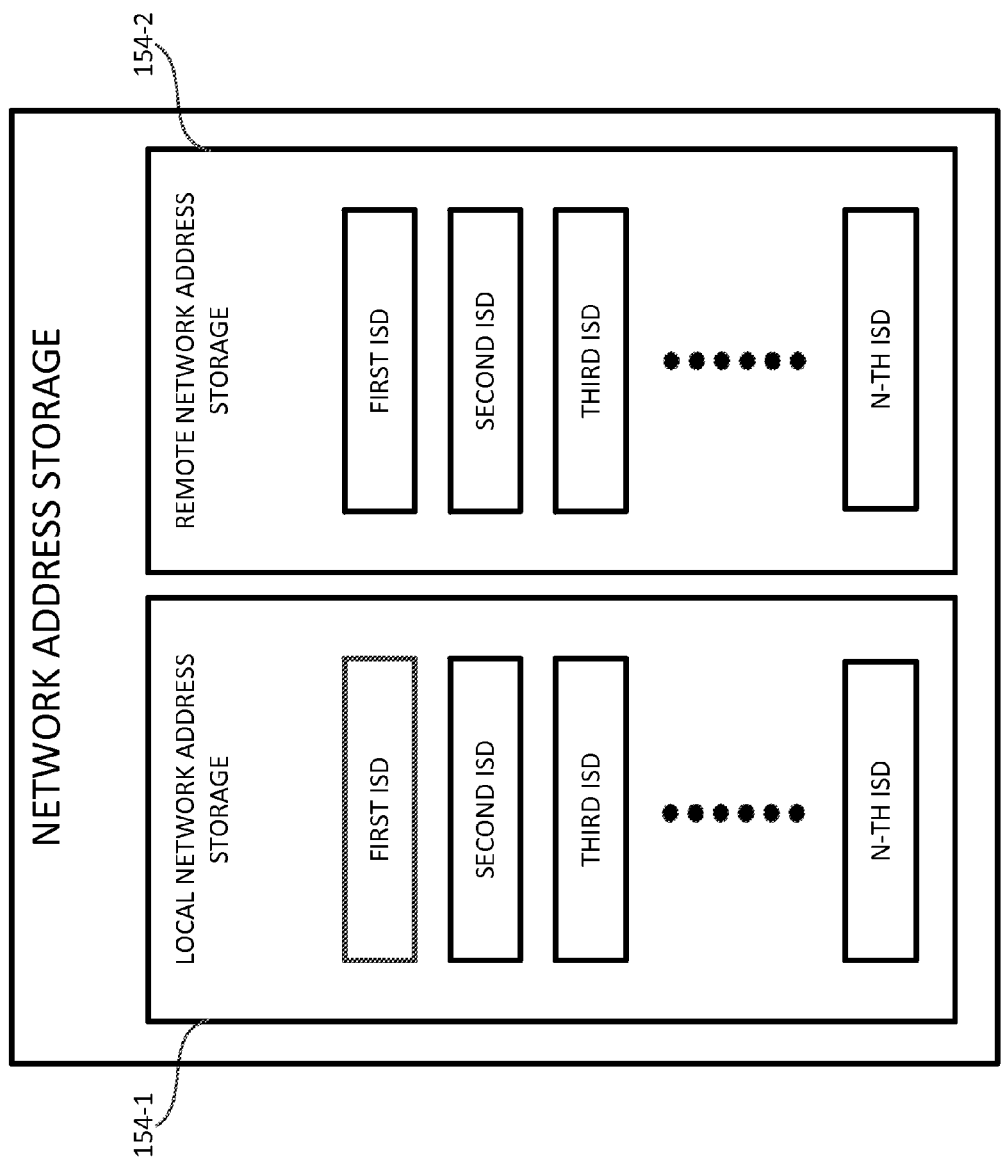
FIG. 4 shows an exemplary network address storage of the interconnected switching device shown in FIG. 3 according to one embodiment of the present disclosure.

In certain embodiments, the memory 150 includes a network address storage 154, and firmware 152. Referring now to FIG. 4, an exemplary network address storage of the interconnected switching device is shown according to one embodiment of the present disclosure. For a programmable switching system 10 having N ISDs 100, the network address storage 154 of a master ISD 101 includes: a local network address storage 154-1, and a remote network address storage 154-2, each having N storage spaces, one for each of the N ISDs 100. The local network address storage 154-1 is configured to store network addresses of N ISDs 100 having control over a corresponding first appliance 201 connected to the master ISD 101 as shown in FIG. 2. The remote network address storage 154-2 is configured to store network addresses of the N ISDs 100 controlled by the master ISD 101.

When the firmware 152 is executed at the microprocessor 140, the firmware 152 is configured to: (a) communicate with all ISDs 100 of the programmable switching system 10 through the communication interface 130 over the network 300, (b) receive user's inputs at the switches 120 of the ISDs 100 of the programmable switching system 10, and in response of the received user's inputs, to program the ISDs 100, when the switch 120 is in the programming mode, and (c) receive user's input at the switch 120 to perform switching functions of the ISD 100, when the switch 120 is in the switching mode.

In certain embodiments, when the switch 120 is in the programming mode, the microprocessor 140 of a master ISD 101 programs all ISDs 100 in the programmable switching system 10 to associate or disassociate the master ISD 101 with all other ISDs 10X such that when a user performs a switching function at the ISD 100, the other ISDs 10X may react in a similar fashion in response to the switching function the user performed. When the switch 120 of the master ISD 101 is in the switching mode, the microprocessor 140 of the master ISD 101 controls the operation of the master ISD 101 to turn on or turn off the first appliance 201, and other appliances such as the second appliance 202, the third appliance 203, . . . , and the N-th appliance 20N programmed and associated with the master ISD 101.

In certain embodiments, the switch 120 of the ISD 100 is configured to perform following functions:

(a) a first function PRO_ADD to set the switch 120 in a programming adding mode and to add one or more ISDs 100 in the programmable switching system 10 to be controlled by the switch 120 of the master ISD 101;

(b) a second function PRO_REMOVE to set the switch 120 in a programming removing mode and to remove one or more ISDs 100 from the programmable switching system 10 to be controlled by the switch 120 of the master ISD 101;

(c) a third function SW_SET to provide input to the switch 120 for associating the network addresses of the ISDs 100 with the master ISD 101;

(d) a fourth function of PRG_OFF to set the switch 120 in the switching mode;

(e) a fifth function SW_ON to turn on the all appliances connected to the slave ISDs with their network addresses stored in the remote network address storage 154-2 of the master ISD 101; and (f) a sixth function SW_OFF to turn off the all appliances connected to the slave ISDs with their network addresses stored in the remote network address storage 154-2 of the master ISD 101.

Figure 5:
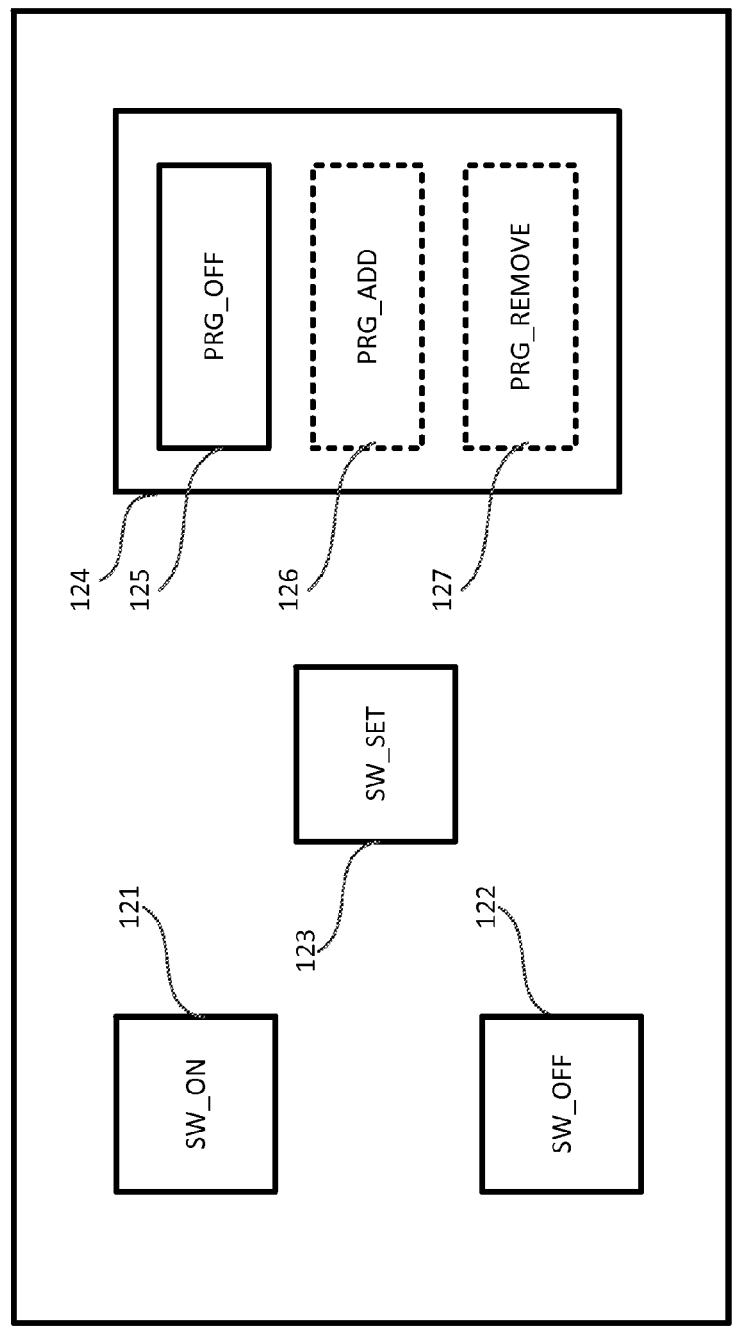
FIG. 5 shows an exemplary switch shown in FIG. 3 according to one embodiment of the present disclosure.

Referring now to FIG. 5, a block diagram of a switch 120 of an ISD 100 is shown according to one embodiment of the present disclosure. In certain embodiments, the switch 120 includes:

(a) a first push button switch 121 for the selection of the fifth function SW_ON;

(b) a second push button switch 122 for the selection of the sixth function SW_OFF;

(c) a third push button switch 123 for the selection of the third function SW_SET; and (d) a three position switch 124 for the selection of the first function PRG_ADD 126, the second function PRG_REMOVE 127, and the fourth function PRG_OFF 125.

In certain embodiments, when a user slides the three position switch 124 to position 126 PRG_ADD, the switch 120 sends a programming adding signal to the microprocessor 140, indicating the user's intent to add one or more ISDs 100 in the programmable switching system 10 to be controlled by the switch 120 of the master ISD 101.

When the firmware 152 of the master ISD 101 is executed at the microprocessor 140, the microprocessor 140 instruct the master ISD 101 to:

(a) set the switch 120 of the master ISD 101 in a programming adding mode;

(b) send a programming adding command to the N ISDs 100 through the communication interface 130 of the master ISD 101;

(c) receive an input from a user selection of the third function SW_SET from a switch 120 of a n-th ISD;

(d) compare the network address of the n-th ISD with the network addresses stored in the remote network address storage 154-2 of the master ISD 101;

(e) write the network address of the n-th ISD in the n-th network address storage space of the remote network address storage 154-2 of the master ISD 101, when the network address of the n-th ISD is not found in the remote network address storage 154-2 of the master ISD 101;

(f) repeat the last three actions (c), (d), and (e) to complete the programming for each of the ISDs 100;

(g) receive a user selection of the fourth function PRO_OFF to end the programming mode; and (h) set the switch 120 of the master ISD 101 in the switching mode.

In the programming adding mode, if the user wants a specific ISD to be associated with the master ISD 101, after the master ISD 101 sends a programming adding command to the N ISDs 100, that specific ISD will be placed in the programming adding mode. When the user selects the third function SW_SET on the switch 120 of the specific ISD, a request for associating the specific ISD to the master ISD 101 with the network address of the specific ISD is sent to the master ISD 101. The master ISD 101 will compare the network addresses of the specific ISD with the network addresses stored in the remote network address storage 154-2 of the master ISD 101. If the network addresses of the specific ISD is not found in the remote network address storage 154-2 of the master ISD 101, the microprocessor 140 will write the network addresses of the specific ISD into the remote network address storage 154-2 of the master ISD 101. The specific ISD is now programmed and associated with the master ISD 101.

In certain embodiments, when a user slides the three position switch 124 to position 127 PRG_REMOVE, the switch 120 sends a programming removing signal to the microprocessor 140, indicating the user's intent to remove one or more ISDs 100 in the programmable switching system 10 to be controlled by the switch 120 of the master ISD 101.

When the firmware 152 of the master ISD 101 is executed at the microprocessor 140, the microprocessor 140 instruct the master ISD 101 to:

(a) set the switch 120 of the master ISD 101 in a programming removing mode;

(b) send a programming removing command to the N ISDs 100 through the communication interface 130 of the master ISD 101;

(c) receive an input from a user selection of the third function SW_SET from a switch 120 of a n-th ISD;

(d) compare the network address of the n-th ISD with the network addresses stored in the remote network address storage 154-2 of the master ISD 101;

(e) delete the network address of the n-th ISD in the n-th network address storage space of the remote network address storage 154-2 of the master ISD 101, when the network address of the n-th ISD is found in the remote network address storage 154-2 of the master ISD 101;

(f) repeat the last three actions (c), (d), and (e) to complete the programming for each of the ISDs 100;

(g) receive a user selection of the fourth function PRO_OFF to end the programming mode; and (h) set the switch 120 of the master ISD 101 in the switching mode.

In the programming removing mode, if the user wants a specific ISD to be disassociated with the master ISD 101, after the master ISD 101 sends a programming removing command to the N ISDs 100, that specific ISD will be placed in the programming adding mode. When the user selects the third function SW_SET on the switch 120 of the specific ISD, a request for disassociating the specific ISD to the master ISD 101 with the network address of the specific ISD is sent to the master ISD 101. The master ISD 101 will compare the network addresses of the specific ISD with the network addresses stored in the remote network address storage 154-2 of the master ISD 101. If the network addresses of the specific ISD is found in the remote network address storage 154-2 of the master ISD 101, the microprocessor 140 will delete the network addresses of the specific ISD into the remote network address storage 154-2 of the master ISD 101. The specific ISD is now programmed and disassociated with the master ISD 101.

Therefore, the programming of associated ISDs 100 is very simple: (a) at the master ISD 101, the user selects the PRG_ADD or PRG_REMOVE function, (b) at any other ISDs 100 where the user wants to associate or disassociate, select the SW_SET function or press the push button switch 123, and (c) when all other ISDs 100 are programmed, the user selects the PRG_OFF to complete the programming. These programming steps are very simple and straightforward. Once the programming is completed, when the user presses the SW_ON and SW_OFF to control the appliances connected to all ISDs having their network addresses stored in the remote network address storage 154-2 of the master ISD 101.

When the three position switch 124 is switched to position 125 PRG_OFF, and the user presses the push button switch 121 for the fifth function SW_ON, the switch 120 sends a turning on signal to the microprocessor 140, indicating the user's intent to turn on the appliances of the ISDs 100 programmed and associated with the master ISD 101.

When the firmware 152 of the master ISD 101 is executed at the microprocessor 140, the microprocessor 140 sends a turning on command to the ISDs 100 with all network addresses stored in the remote network address storage of the master ISD 101, and instructs each of the ISDs 100 to compare the received network addresses with the network addresses stored in the local network address storage 154-1 of each of the ISDs 100. At one of the ISDs, for example an ISD 10$x$, where $x=2, 3, \ldots,$ and N, receiving the turning on command, if the received network address matches one of the network addresses stored in the local network address storage 154-1 of the ISD 10$x$, and the ISD 10$x$ turns on the appliances 20$x$ of the ISD 10$x$ programmed and associated with the master ISD 101.

When the three position switch 124 is switched to position 125 PRG_OFF, and the user presses the push button switch 122 for the sixth function SW_OFF, the switch 120 sends a turning off signal to the microprocessor 140, indicating the user's intent to turn off the appliances of the ISDs 100 programmed and associated with the master ISD 101.

When the firmware 152 of the master ISD 101 is executed at the microprocessor 140, the microprocessor 140 sends a turning off command to the ISDs 100 with all network addresses stored in the remote network address storage of the master ISD 101, and instructs each of the ISDs 100 to compare the received network addresses with the network addresses stored in the local network address storage 154-1 of each of the ISDs 100. At one of the ISDs, for example an ISD 10$x$, where $x=2, 3, \ldots,$ and N, receiving the turning off command, if the received network address matches one of the network addresses stored in the local network address storage 154-1 of the ISD 10$x$, and the ISD 10$x$ turns off the appliances 20$x$ of the ISD 10$x$ programmed and associated with the master ISD 101.

In another aspect, the present invention relates to a method of programming a group of interconnected switching devices (ISD) 100 to form a programmable switching system 10. The method includes one or more of following operations:

(a) designating an ISD of the plurality of ISDs as a master ISD, and designating the remainder of the plurality of the ISDs as slave ISDs, wherein each of the plurality of ISDs has a unique network address;

(b) communicating with the ISDs 100 through a communication interface 130 of the master ISD 101 over a network 300;

(c) receiving a user's input at a switch 120 of the master ISD 101 to set the switch 120 into one of the two modes: a programming mode, and a switching mode.

When the switch 120 of the master ISD is in the programming mode, the method includes:

(d) receiving a user's input at the switch 120 of the master ISD 101 to add one or more ISDs 100 into the programmable switching system 10 or remove one or more ISDs 100 from the programmable switching system 10; and (e) programming the ISDs 100 in response to the user's inputs at the switches 120s of the ISDs 100 of the programmable switching system 10.

When the switch 120 of the master ISD is in the switching mode, the method includes:

(f) receiving a user's input at the switch 120 of the master ISD 101 to turn on or off the appliances of the ISDs 100 with their network addresses stored in a remote network address storage 154-2 of the master ISD 101; and (g) turning on or off the appliances of the ISDs 100 with their network addresses stored in a remote network address storage 154-2 of the master ISD 101.

In certain embodiments, the programmable switching system 10 includes a group of N interconnected switching devices (ISDs) through a network 300. Each of the ISDs has a unique network address. These ISDs include a first ISD 101, a second ISD 102, a third ISD 103, a fourth ISD 104, and a fifth ISD 105, arranged in a mesh configuration as shown in FIG. 1, where each of the ISDs 100 has a direct connection through the network 300. These ISDs 101, 102, 103, 104, and 105 as shown in FIG. 1, may be collectively referred as ISDs 100. One or more appliances may be connected and controlled by each of these ISDs 100. In certain embodiments, as shown in FIG. 1, a first Appliance 1 201 is connected to and controlled by the first ISD 101, a second Appliance 2 202 is connected to and controlled by the second ISD 102, a third Appliance 3 203 is connected to and controlled by the third ISD 103, a fourth Appliance 4 204 is connected to and controlled by the fourth ISD 104, and a fifth Appliance 5 205 is connected to and controlled by the fifth ISD 105. These appliances 201, 202, 203, 204, and 205 may be collectively referred as appliances 200. In certain embodiments, these ISDs can also be arranged in a master and slave configuration as shown in FIG. 2, where an ISD 101 is designated as a master ISD, and each of N−1 ISDs, 102, 103, . . . , and 10N is designated as slave ISDs, and that are directly connected to the master ISD 101. In certain embodiments, one or more appliances may be connected to and controlled by each of the ISDs 100 as shown in FIG. 2. A First Appliance 201 is connected to and controlled by the master ISD 101, a second Appliance 202 is connected to and controlled by the second ISD 102, a third Appliance 203 is connected to and controlled by the third ISD 103, . . . , and a N-th Appliance 20N is connected to and controlled by the N-th ISD 10N. These ISDs 101, 102, 103, . . . , and 10N as shown in FIG. 2 may also be collectively referred as ISDs 100. In certain embodiments, one or more appliances may be connected to and controlled by each of the ISDs 100 as shown in FIG. 2. A First Appliance 201 is connected to and controlled by the master ISD 101, a second Appliance 202 is connected to and controlled by the second ISD 102, a third Appliance 203 is connected to and controlled by the third ISD 103, . . . , and a N-th Appliance 20N is connected to and controlled by the N-th ISD 10N. These appliances may be collectively referred as appliances 200. When the master ISD is turned on, all appliances such as the first appliance 201, and other appliances 202, 203, . . . , and 20N connected to the N−1 slave ISDs 102, 103, . . . , and 10N may be turned on, simultaneously, and when the master ISD is turned off, all appliances such as the first appliance 201, and other appliances 202, 203, . . . , and 20N connected to the N−1 slave ISDs 102, 103, . . . , and 10N may be turned off, simultaneously.

In certain embodiments, the appliances 200 may be any of the lights, and household appliances powered by electricity. For example, the appliances includes: house lights, electric ceiling fans, television sets, air conditioners, cable set-top boxes, floor lamps, table lamps, desktop or laptop computers, toaster oven, microwave ovens, conventional ovens, refrigerators and many other electric devices.

In certain embodiments, each of the ISDs 100 may be configured as a master ISD 101 and the remainder of the ISDs 100 may be configured as slave ISDs. Some or all of the slave ISDs may be programmed to perform switching functions in response to the instructions from the master ISD 101. For example, in one embodiment as shown in FIG. 2, when the master ISD 101 is turned on, the first appliance 201 connected to the master ISD 101, and other appliances such as the second appliance 202, the third appliance 203, . . . , and the N-th appliance 20N connected to a corresponding slave ISDs 102, 103, . . . , and 10N may be turned on, simultaneously. When the master ISD 101 is turned off, the first appliance 201 connected to the master ISD 101, and other appliances such as the second appliance 202, the third appliance 203, . . . , and the N-th appliance 20N connected to a corresponding slave ISDs 102, 103, . . . , and 10N may be turned off, simultaneously.

In certain embodiments, each of the ISDs 100 in the programmable switching system 10 includes:

(a) the switch 120;
(b) the communication interface 130;
(c) a microprocessor 140;
(d) a memory 150;
(e) an electrical power input 160;
(f) an electrical power output 180; and
(g) an output control circuit 170.

In certain embodiments, the communication interface 130 interconnects the ISDs 100 of the programmable switching system 10 over the network 300. For a wired internet connection, the communication interface 130 may be a network interface card (NIC). For a wireless network, the communication interface 130 may be a mobile communication interface, a Wi-Fi interface, a Zigbee interface or Bluetooth interface.

In certain embodiments, the memory 150 includes a network address storage 154, and firmware 152. For a programmable switching system 10 having N ISDs 100, the network address storage 154 of a master ISD 101 includes: a local network address storage 154-1, and a remote network address storage 154-2, each having N storage spaces, one for each of the N ISDs 100. The local network address storage 154-1 is configured to store network addresses of N ISDs 100 having control over a corresponding first appliance 201 connected to the master ISD 101 as shown in FIG. 2. The remote network address storage 154-2 is configured to store network addresses of the N ISDs 100 controlled by the master ISD 101.

In certain embodiments, the microprocessor 140 controls operation of the ISDs 100 when the switch 120 is in the switching mode and programs the ISDs 100 when the switch 120 is in the programming mode. The memory 150 has a network address storage 154, and firmware 152. When the firmware 152 is executed at the microprocessor 140, the firmware 152 is configured to: control operation of the ISD 100 when the switch 120 is in the switching mode, and program the ISDs 100 when the switch 120 is in the programming mode. The electrical power input 160 connects to an electrical power source through an input power line 162. The electrical power output 180 connects to at least one appliance through an output power line 182. The output control circuit 170 receives instructions from the microprocessor 140 and controls the electrical power output 180.

In certain embodiments, the memory 150 includes a network address storage 154, and firmware 152. For a programmable switching system 10 having N ISDs 100, the network address storage 154 of a master ISD 101 includes: a local network address storage 154-1, and a remote network address storage 154-2, each having N storage spaces, one for each of the N ISDs 100. The local network address storage 154-1 is configured to store network addresses of N ISDs 100 having control over a corresponding first appliance 201 connected to the master ISD 101 as shown in FIG. 2. The remote network address storage 154-2 is configured to store network addresses of the N ISDs 100 controlled by the master ISD 101.

In certain embodiments, the switch 120 of the ISD 100 is configured to perform following functions:

(a) a first function PRO_ADD to set the switch 120 in a programming adding mode and to add one or more ISDs 100 in the programmable switching system 10 to be controlled by the switch 120 of the master ISD 101;

(b) a second function PRO_REMOVE to set the switch 120 in a programming removing mode and to remove one or more ISDs 100 from the programmable switching system 10 to be controlled by the switch 120 of the master ISD 101;

(c) a third function SW_SET to provide input to the switch 120 for associating the network addresses of the ISDs 100 with the master ISD 101;

(d) a fourth function of PRG_OFF to set the switch 120 in the switching mode;

(e) a fifth function SW_ON to turn on the all appliances connected to the slave ISDs[[100]] with their network addresses stored in the remote network address storage 154-2 of the master ISD 101; and (f) a sixth function SW_OFF to turn off the all appliances connected to the slave ISDs[[100]] with their network addresses stored in the remote network address storage 154-2 of the master ISD 101.

In certain embodiments, the switch 120 includes:

(a) a first push button switch 121 for the selection of the fifth function SW_ON;

(b) a second push button switch 122 for the selection of the sixth function SW_OFF;

(c) a third push button switch 123 for the selection of the third function SW_SET; and (d) a three position switch 124 for the selection of the first function PRG_ADD 126, the second function PRG_REMOVE 127, and the fourth function PRG_OFF 125.

In certain embodiments, the method includes one or more of following operations:

(a) receiving a user selection of the first function PRO_ADD to add one or more ISDs 100 in the programmable switching system 10 to be controlled by the switch 120 of the master ISD 101;

(b) setting the switch 120 of the master ISD 101 in the programming adding mode;

(c) sending a programming adding command to the ISDs through the communication interface 130 of the master ISD 101;

(d) receiving an input from a user selection of the third function SW_SET from a switch 120 of a n-th ISD;

(e) comparing the network address of the n-th ISD with the network addresses stored in the remote network address storage 154-2 of the master ISD 101;

(f) writing the network address of the n-th ISD in the n-th network address storage space of the remote network address storage 154-2 of the master ISD 101, when the network address of the n-th ISD is not found in the remote network address storage 154-2 of the master ISD 101;

(g) repeating the last three operations (d), (e), and (f) to complete the programming for each of the ISDs 100;

(h) receiving a user selection of the fourth function PRO_OFF at the switch 120 of the master ISD 101; and (i) setting the switch 120 of the master ISD 101 in the switching mode.

In certain embodiments, the method includes one or more of following operations:

(a) receiving a user selection of the first function PRO_REMOVE to remove one or more ISDs 100 from the programmable switching system 10 to be controlled by the switch 120 of the master ISD 101;

(b) setting the switch 120 of the master ISD 101 in the programming removing mode;

(c) sending a programming removing command to the ISDs through the communication interface 130 of the master ISD 101;

(d) receiving an input from a user selection of the third function SW_SET from a switch 120 of a n-th ISD;

(e) comparing the network address of the n-th ISD with the network addresses stored in the remote network address storage 154-2 of the master ISD 101;

(f) deleting the network address of the n-th ISD in the n-th network address storage space of the remote network address storage 154-2 of the master ISD 101, when the network address of the n-th ISD is found in the remote network address storage 154-2 of the master ISD 101;

(g) repeating the last three operations (d), (e), and (f) to complete the programming for each of the ISDs 100;

(h) receiving a user selection of the fourth function PRO_OFF at the switch 120 of the master ISD 101; and (i) setting the switch 120 of the master ISD 101 in the switching mode.

In certain embodiments, the method includes one or more of following operations:

(a) receiving a user selection of the fifth function SW_ON from the switch 120 of the master ISD 101;

(b) sending a turning on command to the ISDs 100 with all network addresses stored in the remote network address storage 154-2 of the master ISD 101; and (c) instructing each of the ISDs to compare the received network addresses with the network addresses stored in the local network address storage 154-1 of the ISD, and to turn on the appliance connected to the ISD when the network address of the ISD is found in the local network address storage 154-1 of the ISD.

In certain embodiments, the method includes one or more of following operations:

(a) receiving a user selection of the fifth function SW_OFF from the switch 120 of the master ISD 101;

(b) sending a turning off command to the ISDs 100 with all network addresses stored in the remote network address storage 154-2 of the master ISD 101; and (c) instructing each of the ISDs to compare the received network addresses with the network addresses stored in the local network address storage 154-1 of the ISD, and turn on the appliance connected to the ISD when the network address of the ISD is found in the local network address storage 154-1 of the ISD.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A programmable switching system comprising:
a plurality of interconnected switching devices (ISDs), each having a unique network address, wherein each of the plurality of ISDs comprises:
  a switch configured to operate in a switching mode and a programming mode, wherein the switch comprises:
    a first push button switch for the selection of a fifth function SW_ON to turn on all appliances connected to the ISDs;
    a second push button switch for the selection of a sixth function SW_OFF to turn off all appliances connected to the ISDs;
    a third push button switch for the selection of a third function SW_SET to provide input to the switch for associating the network addresses of the plurality of ISDs with the master ISD; and
    a three position switch for the selection of:
      a first function PRG_ADD to set the switch in a programming adding mode and add one or more ISDs in the programmable switching system to be controlled by the switch of a master ISD,
      a second function PRG_REMOVE to set the switch in a programming removing mode and to remove one or more ISDs from the programmable switching system to be controlled by the switch of the master ISD, and
      a fourth function PRG_OFF to set the switch in the switching mode;
  a communication interface configured to interconnect the plurality of ISDs of the programmable switching system over a network;
  a microprocessor configured to control operation of the ISD when the switch is in the switching mode and program the ISD when the switch is in the programming mode; and
  a memory having a network address storage, and firmware, when executed at the microprocessor, configured to:
    communicate with the plurality of ISDs of the programmable switching system through the communication interface;
    receive user's inputs at each switch of the plurality of the ISDs of the programmable switching system to program the plurality of ISDs, when the switch is in the programming mode; and
    receive user's input at the switch to perform switching functions of the ISD, when the switch is in the switching mode.

2. The programmable switching system according to claim 1, wherein the network comprises one of a wired network, the internet, local area network (LAN), wide area network (WAN), a wireless network, mobile communication network, Wi-Fi network, Zigbee personal area network, and Bluetooth network.

3. The programmable switching system according to claim 1, wherein each of the plurality of ISDs further comprises:
  an electrical power input connected to an electrical power source through an input power line;
  an electrical power output connected to at least one appliance through an output power line; and
  an output control circuit to receive instructions from the microprocessor and control the electrical power output.

4. The programmable switching system according to claim 3, wherein each of the plurality of ISDs may be configured as the master ISD and the remainder of the plurality of ISDs may be configured as a plurality of slave ISDs, wherein when the master ISD is turned on, appliances connected to the master ISD, and all appliances connected to the plurality of ISDs programmed as slave ISDs may be turned on, simultaneously, and when the master ISD is turned off, appliances connected to the master ISD, and all appliances connected to the-plurality of ISDs programmed as slave ISDs may be turned off, simultaneously.

5. The programmable switching system according to claim 4, wherein for a programmable switching system having a first number N1 of ISDs, the network address storage of a master ISD comprises:
  a local network address storage having N1 storage spaces, configured to store network addresses of a second number N2 of ISDs having control over a corresponding appliance connected to the master ISD; and
  a remote network address storage having N1 storage spaces, configured to store network addresses of a third number N3 of ISDs controlled by the master ISD.

6. The programmable switching system according to claim 5, wherein the firmware of the master ISD is configured to
  (a) receive a user selection of the first function PRO_ADD to add one or more ISDs in the programmable switching system to be controlled by the switch of the master ISD;
  (b) set the switch of the master ISD in the programming adding mode;
  (c) send a programming adding command to the plurality of ISDs through the communication interface of the master ISD;
  (d) receive an input from a user selection of the third function SW_SET from a switch of a n-th ISD;
  (e) compare the network address of the n-th ISD with the network addresses stored in the remote network address storage of the master ISD;
  (f) write the network address of the n-th ISD in the n-th network address storage space of the remote network address storage of the master ISD, when the network address of the n-th ISD is not found in the remote network address storage of the master ISD;
  (g) repeat the last three actions (d), (e), and (f) to complete the programming for each of the plurality of ISDs;
  (h) receive a user selection of the fourth function PRO_OFF at the switch of the master ISD; and
  (i) set the switch of the master ISD in the switching mode.

7. The programmable switching system according to claim 5, wherein the firmware of the master ISD is further configured to
  (a) receive a user selection of the second function PRO_REMOVE to remove one or more ISDs from the programmable switching system to be controlled by the switch of the master ISD;
  (b) set the switch of the master ISD in the programming adding mode;

(c) send a programming removing command to the plurality of ISDs through the communication interface of the master ISD;

(d) receive an input from a user selection of the third function SW_SET from a switch of a n-th ISD;

(e) compare the network address of the n-th ISD with the network addresses stored in the remote network address storage of the master ISD;

(f) delete the network address of the n-th ISD in the n-th network address storage space of the remote network address storage of the master ISD, when the network address of the n-th ISD is found in the remote network address storage of the master ISD;

(g) repeat the last three actions (d), (e), and (f) to complete the programming for each of the plurality of ISDs;

(h) receive a user selection of the fourth function PRO_OFF at the switch of the master ISD; and (i) set the switch of the master ISD in the switching mode.

8. The programmable switching system according to claim 5, wherein the firmware of the master ISD is further configured to receive a user selection of the fifth function SW_ON from the switch of the master ISD;

send a turning on command to the plurality of ISDs with all network addresses stored in the remote network address storage of the master ISD; and instruct each of the plurality of ISDs to
compare the received network addresses with the network addresses stored in the local network address storage of the ISD; and
turn on the appliance connected to the ISD when the received network address of the ISD is found in the local network address storage of the ISD.

9. The programmable switching system according to claim 5, wherein the firmware of the master ISD is further configured to receive a user selection of the sixth function SW_OFF from the switch of the master ISD;

send a turning off command to the plurality of ISDs with all network addresses stored in the remote network address storage of the master ISD; and instruct each of the plurality of ISDs to
compare the received network addresses with the network addresses stored in the local network address storage of the ISD; and
turn off the appliance connected to the ISD when the received network address of the ISD is found in the local network address storage of the ISD.

10. A method of programming a plurality of interconnected switching devices (ISD) to form a programmable switching system comprising:

designating an ISD of the plurality of ISDs as a master ISD, and designating the remainder of the plurality of the ISDs as slave ISDs, wherein each of the plurality of ISDs has a unique network address;

communicating with the plurality of ISDs through a communication interface of the master ISD over a network;

receiving a user's input at a switch of the master ISD to set the switch into one of the two modes: a programming mode, and a switching mode, wherein the switch comprises:
a first push button switch for the selection of a fifth function SW_ON to turn on the all appliances connected to the ISDs;
a second push button switch for the selection of a sixth function SW_OFF a sixth function SW_OFF to turn off the all appliances connected to the ISDs;
a third push button switch for the selection of a third function SW_SET to provide input to the switch for associating the network addresses of the plurality of ISDs with the master ISD; and
a three-position switch for the selection of a first function PRG_ADD to set the switch in a programming adding mode and add one or more ISDs in the programmable switching system to be controlled by the switch of a master ISD, a second function PRG_REMOVE to set the switch in a programming removing mode and to remove one or more ISDs from the programmable switching system to be controlled by the switch of the master ISD and a fourth function PRG_OFF to set the switch in the switching mode;

when the switch of the master ISD is in the programming mode:
receiving a user's input at the switch of the master ISD to add one or more ISDs into the programmable switching system or remove one or more ISDs from the programmable switching system; and
programming the plurality of ISDs in response to the user's inputs at the switches of these ISDs of the programmable switching system; and when the switch of the master ISD is in the switching mode:
receiving a user's input at the switch of the master ISD to turn on or off appliances connected to and controlled by the slave ISDs with their network addresses stored in a remote network address storage of the master ISD; and
turning on or off the appliances connected to and controlled by the slave ISDs with their network addresses stored in the remote network address storage of the master ISD.

11. The method according to claim 10, wherein each of the plurality of ISD comprises:
the switch configured to operate in the switching mode and the programming mode;
the communication interface configured to interconnect the plurality of ISDs in the programmable switching system over the network;
a microprocessor configured to control operation of the ISD when the switch is in the switching mode and program the ISD when the switch is in the programming mode;
a memory having a network address storage, and firmware, when executed at the microprocessor, configured to:
control operation of the ISD when the switch is in the switching mode and program the ISD when the switch is in the programming mode;
an electrical power input connected to an electrical power source through an input power line;
an electrical power output connected to at least one appliance through an output power line; and
an output control circuit configured to receive instructions from the microprocessor and control the electrical power output.

12. The method according to claim 11, wherein for a programmable switching system having a first number N1 of ISDs, the network address storage of a master ISD comprises: a local network address storage having N1 storage spaces, configured to store network addresses of a second number N2 of ISDs having control over a corresponding appliance connected to the master ISD; and a remote network address storage having N1 storage spaces, configured to store network addresses of a third number N3 of ISDs controlled by the master ISD.

13. The method according to claim 12 further comprising:
(a) receiving a user selection of the first function PRO_ADD to add one or more ISDs in the programmable switching system to be controlled by the switch of the master ISD;
(b) setting the switch of the master ISD in the programming adding mode;
(c) sending a programming adding command to the plurality of ISDs through the communication interface of the master ISD;
(d) receiving an input from a user selection of the third function SW_SET from a switch of a n-th ISD;
(e) comparing the network address of the n-th ISD with the network addresses stored in the remote network address storage of the master ISD;
(f) writing the network address of the n-th ISD in the n-th network address storage space of the remote network address storage of the master ISD, when the network address of the n-th ISD is not found in the remote network address storage of the master ISD;
(g) repeating the last three operations (d), (e), and (f) to complete the programming for each of the plurality of ISDs;
(h) receiving a user selection of the fourth function PRO_OFF at the switch of the master ISD; and
(i) setting the switch of the master ISD in the switching mode.

14. The method according to claim 12 further comprising:
(a) receiving a user selection of the second function PRO_REMOVE to remove one or more ISDs from the programmable switching system to be controlled by the switch of the master ISD;
(b) setting the switch of the master ISD in the programming removing mode;
(c) sending a programming removing command to the plurality of ISDs through the communication interface of the master ISD;
(d) receiving an input from a user selection of the third function SW_SET from a switch of a n-th ISD;
(e) comparing the network address of the n-th ISD with the network addresses stored in the remote network address storage of the master ISD;
(f) deleting the network address of the n-th ISD in the n-th network address storage space of the remote network address storage of the master ISD, when the network address of the n-th ISD is found in the remote network address storage of the master ISD;
(g) repeating the last three operations (d), (e), and (f) to complete the programming for each of the plurality of ISDs;
(h) receiving a user selection of the fourth function PRO_OFF at the switch of the master ISD; and
(i) setting the switch of the master ISD in the switching mode.

15. The method according to claim 12 further comprising:
receiving a user selection of the fifth function SW_ON from the switch of the master ISD; sending a turning on command to the plurality of ISDs with all network addresses stored in the remote network address storage of the master ISD; and instructing each of the plurality of ISDs to compare the received network addresses with the network addresses stored in the local network address storage of the ISD; and turn on the appliance connected to the ISD when the received network address of the ISD is found in the local network address storage of the ISD.

16. The method according to claim 12 further comprising:
receiving a user selection of the fifth function SW_OFF from the switch of the master ISD;
sending a turning off command to the plurality of ISDs with all network addresses stored in the remote network address storage of the master ISD; and
instructing each of the plurality of ISDs to compare the received network addresses with the network addresses stored in the local network address storage of the ISD; and
turn off the appliance connected to the ISD when the received network address of the ISD is found in the local network address storage of the ISD.

* * * * *